United States Patent
von Rijsbergen

(10) Patent No.: US 6,377,694 B1
(45) Date of Patent: Apr. 23, 2002

(54) FLUSH MOUNTABLE AUTOMOBILE AUDIO AMPLIFIER

(75) Inventor: Peter A. von Rijsbergen, Novato, CA (US)

(73) Assignee: Autotek Corporation, Burlingame, CA (US)

( * ) Notice: Subject to any disclaimer, the term of this patent is extended or adjusted under 35 U.S.C. 154(b) by 0 days.

(21) Appl. No.: 09/035,703

(22) Filed: Mar. 5, 1998

(51) Int. Cl.[7] .............................. H04R 1/02; H04B 1/00
(52) U.S. Cl. ........................................... 381/87; 381/86
(58) Field of Search ............................. 381/86, 87, 332, 381/334, 336, 389; D14/188

(56) References Cited

U.S. PATENT DOCUMENTS

| | | | | |
|---|---|---|---|---|
| 4,550,796 A | * | 11/1985 | Tomita | 381/86 |
| 4,971,270 A | * | 11/1990 | Megregian et al. | 248/27.1 |
| 5,130,891 A | * | 7/1992 | Christie | 361/726 |
| 5,285,500 A | * | 2/1994 | Mantz | 381/86 |
| D386,761 S | * | 11/1997 | Pleitz | D14/188 |

* cited by examiner

Primary Examiner—Forester W. Isen
Assistant Examiner—Brian Tyrone Pendleton
(74) Attorney, Agent, or Firm—Oppenheim Wolff & Donnelly LLP; Claude A. S. Hamrick

(57) ABSTRACT

A automobile audio amplifier (10) for having an upper body portion (12) and a lower body portion (14), the upper body portion (12) being larger so as to form a mounting rim (16) for affixing the automobile audio amplifier (10) in a mounting hole (18) of a mounting surface (20). A plurality of corner brackets (32, 32a) are provided for optionally positioning substantially under the mounting rim for affixing the automobile audio amplifier (10) to the exterior of the mounting surface (20). Within the automobile audio amplifier 10 is an amplifier circuit (28) having affixed thereto a plurality of wiring blocks (22) for attaching a like plurality of wires (30).

8 Claims, 4 Drawing Sheets

FLUSH MOUNTABLE AUTOMOBILE AUDIO AMPLIFIER

TECHNICAL FIELD

The present invention relates to the field of audio electronics and more specifically to an improved automobile audio amplifier. The predominant current usage of the present inventive automobile audio amplifier is in high quality audio systems wherein it is desirable to provide a relatively large high power amplifier while maintaining a neat a visually pleasing appearance and adequate cooling to dissipate the heat from the amplifier.

BACKGROUND ART

Automotive sound systems are generally vastly improved over comparable systems of only a few years ago. Stock systems from the automobile manufacturers are often equal to or better than many of the after market custom systems of the past. Nevertheless, the remains an increasing demand for even bigger and better sounding after market audio amplifiers and other automotive audio components.

In providing improved high power audio systems, one of the more problematic components has been the audio amplifier. The available space in automotive installations is inherently quite limited, and such amplifiers are inherently fairly large. Moreover, such amplifiers require a large cooling surface in order to dissipate the heat produced, and this large cooling surface has generally been in the form of cooling fins which take up even more space.

Yet another problem encountered in the installation of automobile audio power amplifiers is that the wires which must be connected to the amplifier should also be fairly large in order to adequately provide power to the speakers without damping or other unwanted effect. Such wires are, themselves, often unsightly in that it is difficult to conceal at least a portion of the wire runs. Also, the point at which the wires connect to the amplifier can be less than desirably attractive.

A review of the literature in the field reveals that the available high power automobile audio amplifiers are essentially all "surface mount" type units which are designed to be affixed (by bolts, or the like) to a flat surface, with cooling fins protruding from surfaces not directly adjacent to the mounting surface. Since the mounting surface of the amplifier cannot be expected to dissipate heat well (because it will be flush against an automobile surface which may well not be a good conductor of heat, and further because efficient heat transfer between the amplifier surface and the automobile surface cannot be assured) the entire cooling surface must be provided by the cooling fins and, therefore, the cooling fins must necessarily be relatively large.

Yet another factor in the placement of an audio power amplifier is that the owner, while obviously not wanting the amplifier to be unsightly or obtrusive, may not want the amplifier to be completely hidden from view either. Indeed, when the owner has gone to the trouble and expense of installing a "high end" stereo system in an automobile, the owner may well like to keep the power amplifier tastefully and unobtrusively displayed. To this end, after market audio systems are often installed on a mounting board which is frequently located in the trunk of the automobile. However, such solutions have still left the unsightly wires exposed, thereby negating much of the advantage of trying to make a neat an attractive installation.

It would be advantageous to have an automobile audio amplifier which could be mounted in a more attractive manner and/or in a manner which takes better advantage of the available space. However, to the inventor's knowledge, while many variations exist, no amplifier has improved on the conventional surface mounted amplifiers currently available on the market.

It would also be advantageous to have an automobile audio amplifier which provides is increased cooling area without the necessity of large cooling fins. However, the fact that essentially all such amplifiers on the market today rely upon cooling though a cooling surface which does not include generally all surfaces of the amplifier evidences the fact that such an improvement has not existed in the prior art.

DISCLOSURE OF INVENTION

Accordingly, it is an object of the present invention to provide an automobile audio amplifier which can be unobtrusively and neatly installed.

It is still another object of the present invention to provide an automobile audio amplifier which provides for routing of connecting wires without exposing such wires within the passenger compartment of the automobile.

It is yet another object of the present invention to provide an automobile power amplifier which can be easily and inexpensively installed.

It is still another object of the present invention to provide an automobile audio amplifier which provides a large cooling surface area without the necessity of large and unsightly cooling fins.

It is yet another object of the present invention to provide an automobile power amplifier which is attractive in appearance and yet effective in operation.

Briefly, the preferred embodiment of the present invention is a solid state automobile audio power amplifier having a housing shaped such that the amplifier can be mounted in a mounting hole such as might be provided or produced in the passenger compartment of an automobile. An "upper" amplifier body will project into a first area (such as the passenger compartment) while a "lower" amplifier body will project into a second area (such as the trunk, or within the door of the automobile). Connecting wires are affixed to the lower amplifier body so as to as to eliminate the necessity of running such wires within the first area. Since very little of the amplifier is mounted flush against any surface, most of the entire surface of the amplifier is provided as a cooling surface. In a described embodiment, optional legs are provided for mounting the amplifier entirely within a single area.

An advantage of the present invention is that the appearance of an automobile audio amplifier is improved while retaining the functionality.

A further advantage of the present invention is that an increased cooling surface is provided.

Yet another advantage of the present invention is that wires may be routed through the trunk, or the like, of an automobile.

Still another advantage of the present invention is that limited space within an automobile is preserved.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 4 is a side view of the automobile audio amplifier of FIG. 1 showing the automobile audio amplifier mounted to a mounting surface;

FIG. 7 is a perspective view of a wiring block section as used in conjunction with the disclosed embodiment of the automobile audio amplifier of FIG. 1.

BEST MODE FOR CARRYING OUT INVENTION

Figure 1:
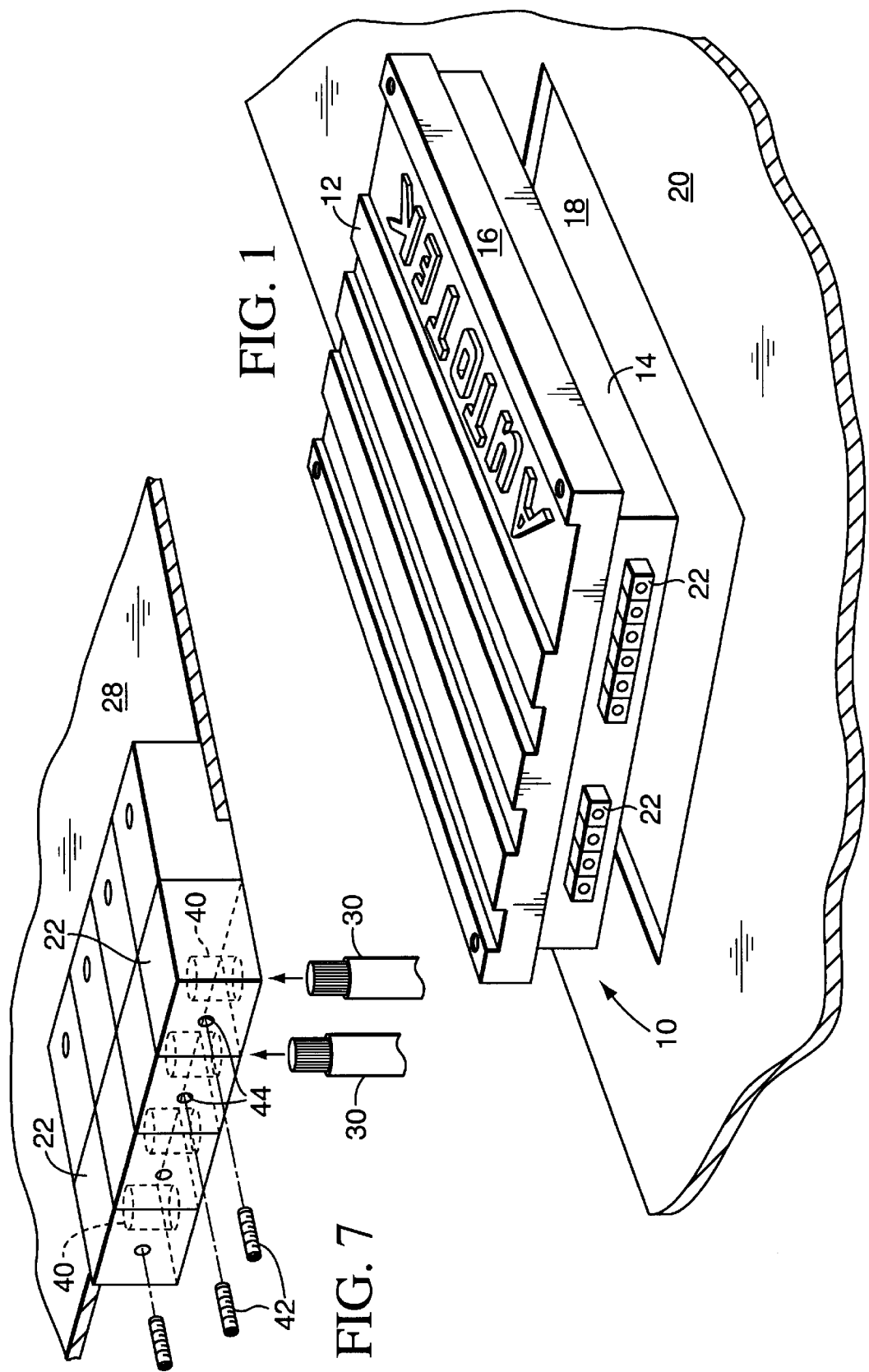
FIG. 1 is a perspective view of an automobile audio amplifier according to the present invention.

The best presently known mode for carrying out the invention is an improved automobile audio amplifier. The inventive automobile audio amplifier is depicted in a perspective view in FIG. 1 and is designated therein by the general reference character 10. The automobile audio amplifier 10 has an upper body portion 12 and a lower body portion 14. As can be seen in the view of FIG. 1, the upper body portion 12 is larger in perimeter than the lower body portion 14 such that a mounting rim 16 is provided. Therefore, the lower body portion 14 will fit through a mounting hole 18 provide in an automobile mounting surface 20, while the mounting rim 16 on the upper body portion 12 prevents the upper body portion 12 from slipping through the mounting hole 18.

A plurality of wiring blocks 22 are provided. In the best presently known embodiment 10 of the present invention, there are eight wiring blocks. As with most conventional audio amplifiers, there are wiring blocks 22 provided as follows; two each for right and left audio input, two each for right and left audio output, and two for power input. One skilled in the art will be familiar with appropriate electrical connection of these inputs and outputs to and from the automobile audio amplifier 10.

Figure 2:
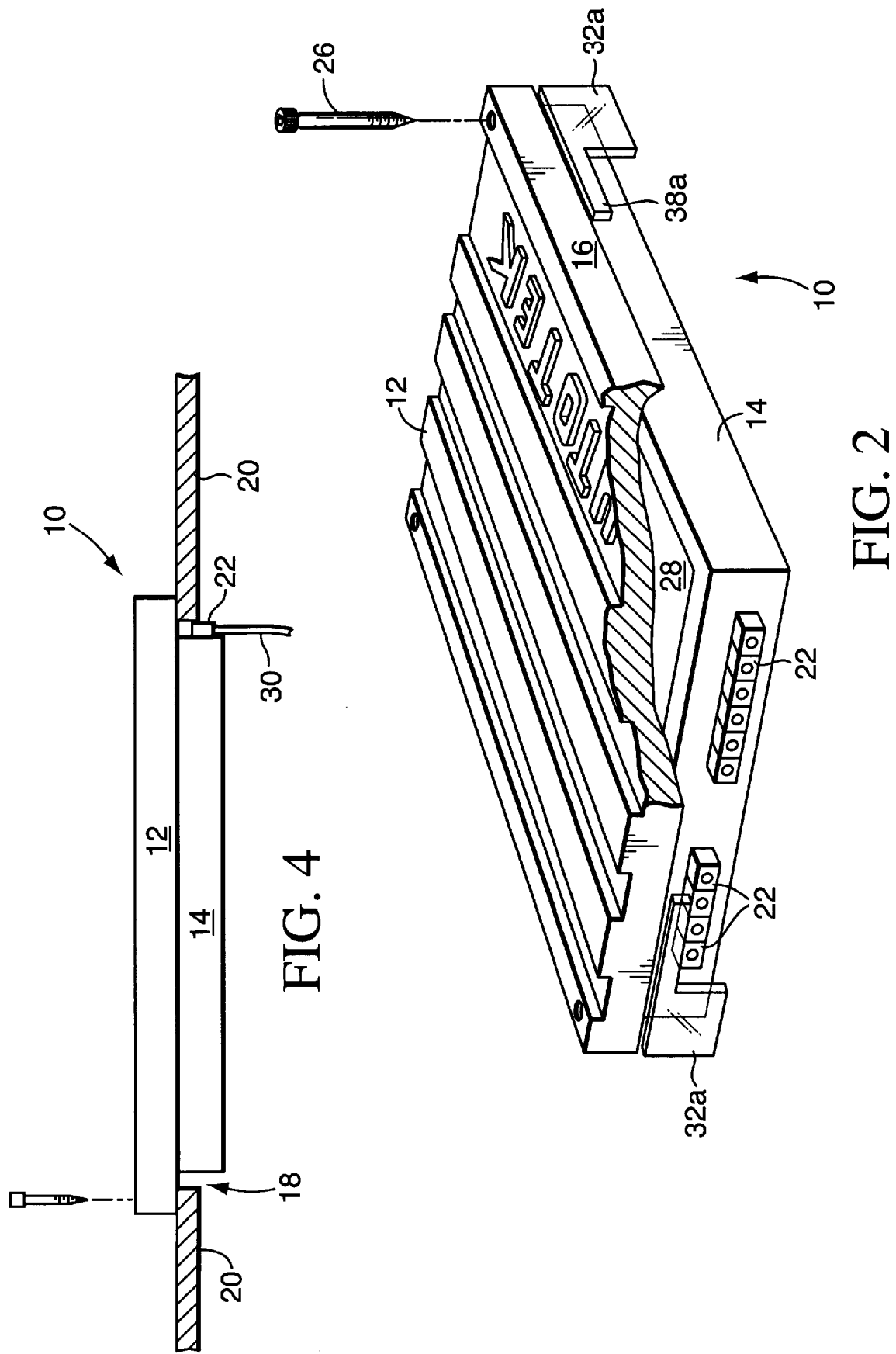
FIG. 2 is a partially cut away perspective view of the automobile audio amplifier of FIG. 1.
Figure 3:
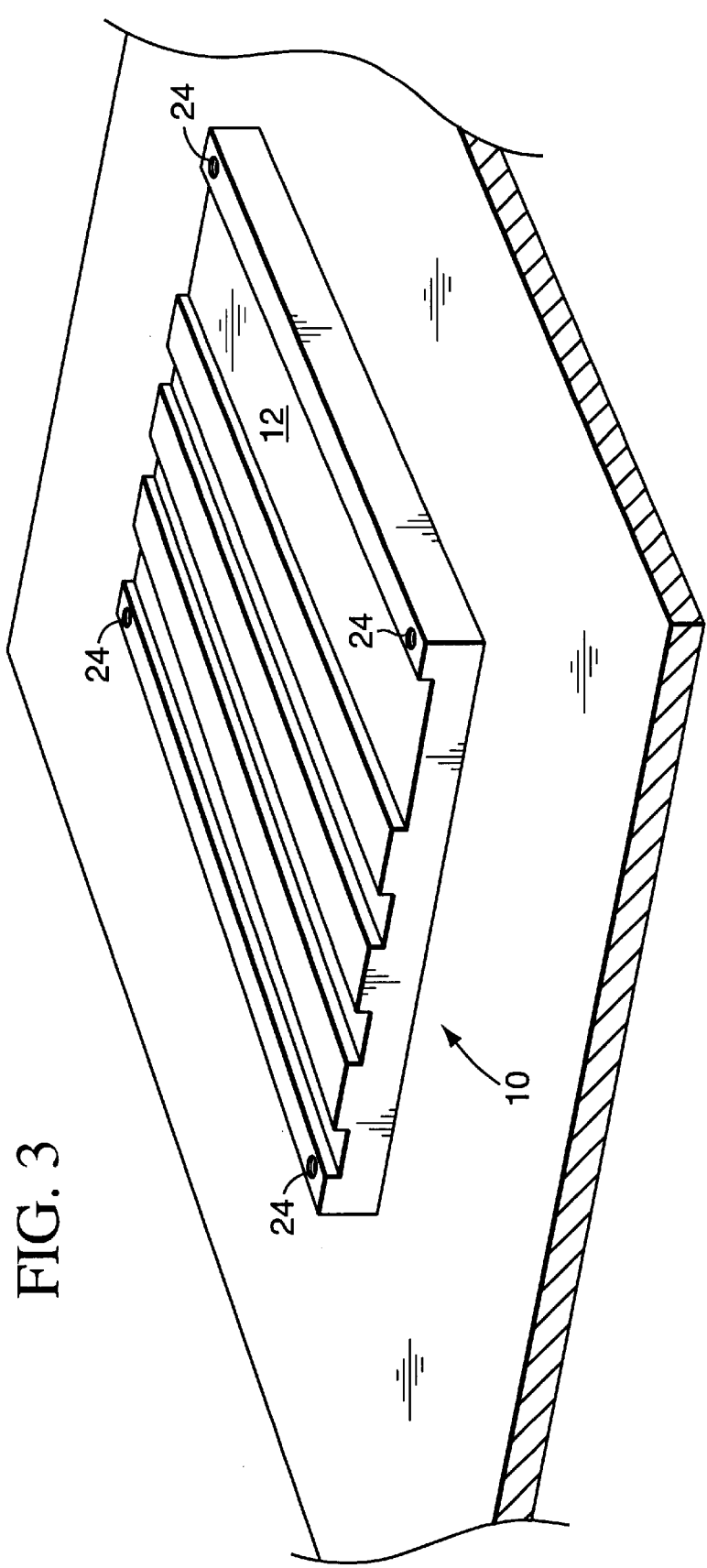
FIG. 3 is a perspective view of the automobile amplifier of FIG. 1 mounted in a mounting surface.

FIG. 3 is a perspective view of the automobile audio amplifier 10 affixed to the mounting surface 20. Four bolt holes 24 are provided in the best presently known embodiment 10 of the invention, with one each of the bolt holes 24 located at each corner of the upper body portion 12 passing through the mounting rim 16. Referring again to the view of FIG. 2, a typical bolt is depicted. The bolts 26 can be provided with screw type points as depicted in the example of FIG. 2, for screwing into the mounting surface (FIG. 3). Alternatively, the bolts could be of the type designed for use with an associated nut (not shown), in which case holes would be provided in the mounting surface 20 for passing the bolt 26 therethrough.

In the partially cut away view of FIG. 2, it can be seen that, in the best presently known embodiment 10 of the present invention, the upper body portion 12 is a solid piece of heat conductive metal (aluminum, in this embodiment) such that the upper body portion 12 is a heat sink for an amplifier circuit 28 contained within the lower body portion 14. In this embodiment, the lower body portion is made of sheet metal. The amplifier circuit 28 is conventional in nature, and essentially any electronic amplifier circuit could be used in conjunction with the present invention.

FIG. 4 is a side view of the inventive automobile audio amplifier 10 with the mounting surface 12 shown in cross section. In the view of FIG. 4 it can be seen that the lower body portion 14 is inserted within the mounting hole 18 such that a plurality of wires is not visible from the upper body portion 12 side of the mounting surface 20. It should be noted that one alternative variation of this mounting method might be to insert spacers between the upper body portion 12 and the mounting surface 20 to allow some air circulation around the lower body portion 14 through the mounting hole 18.

Figure 5:
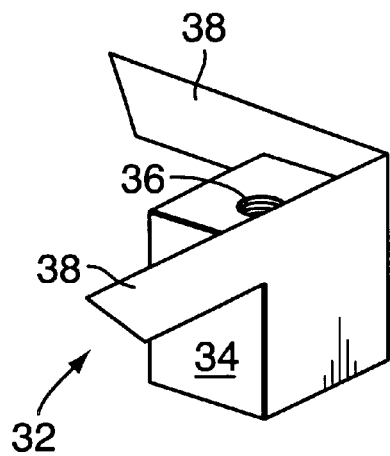
FIG. 5 is a perspective view of a corner bracket which can optionally be used for mounting the automobile audio amplifier of FIG. 1.

FIG. 5 is a perspective view of a corner bracket 32 which can optionally be used to mount the inventive automobile audio amplifier 10. As can be seen in the view of FIG. 5, the corner bracket 32 is essentially a rectangular block 34 (made of plastic in this embodiment) having a bolt hole 36 therein. A pair "wing" projections 38 extend therefrom. It is intended that four of the corner brackets 32 be provided such that one each of the corner brackets 32 can be used at each of the four bolt holes 24 (FIG. 3) when using this optional attachment method. Preferably, the corner brackets 32 will be just long enough to fill the space between the upper body portion 12 and whatever surface the automobile audio amplifier 10 is to be mounted. However, it is within the scope of the invention that the corner brackets 32 be provided in a somewhat longer length such that air space will be provided below the lower body portion 14 for additional cooling.

Figure 6:
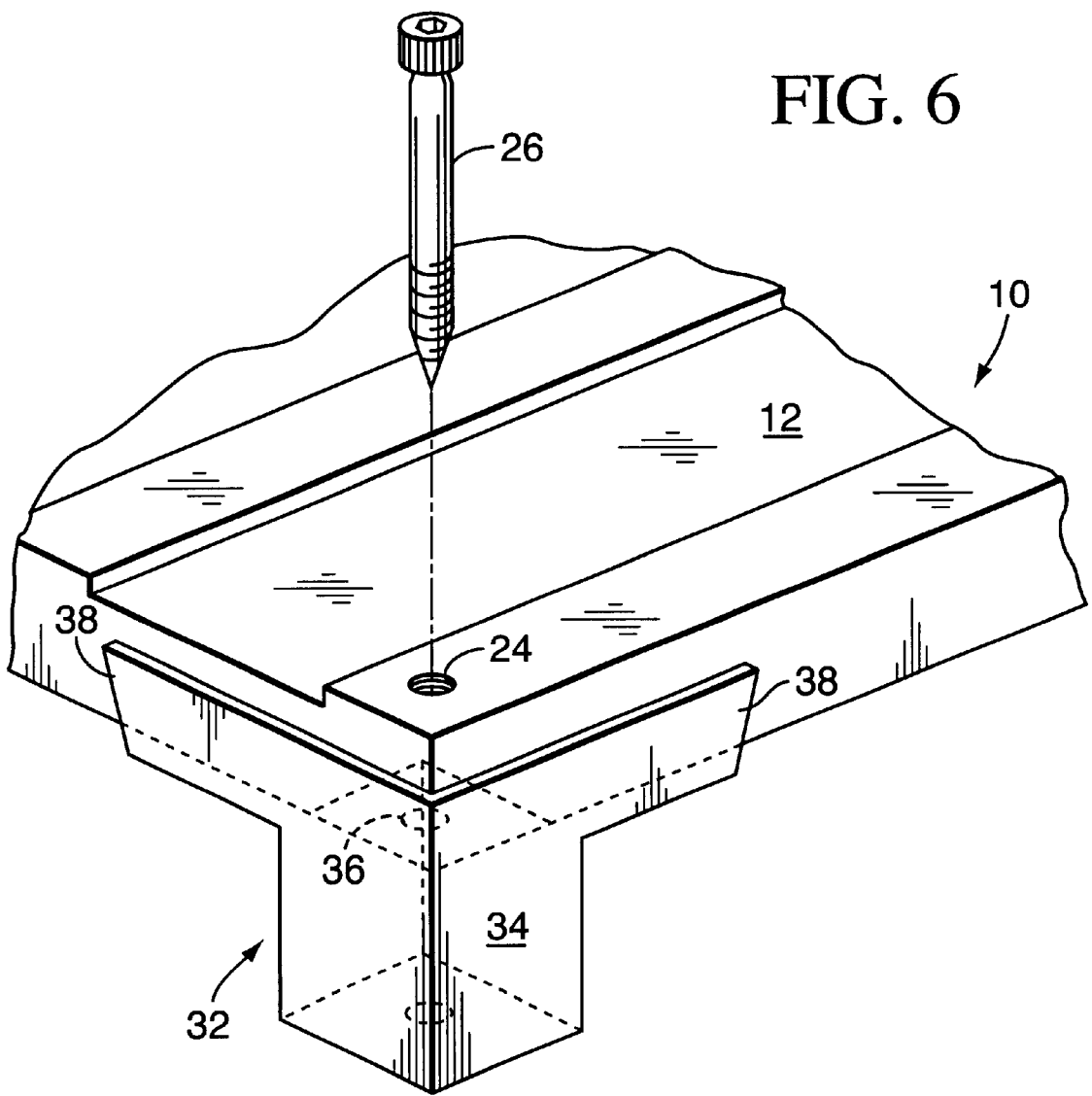
FIG. 6 is a perspective view of a portion of the inventive automobile audio amplifier of FIG. 1 showing the corner bracket of FIG. 5 in conjunction therewith.

FIG. 6 is a perspective view of a corner of the automobile audio amplifier 10 showing one of the corner brackets 32 in cooperation therewith. As can be seen in the view of FIG. 6, the wing projections 38 help to locate the corner bracket 32 and keep it from turning in relation to the automobile audio amplifier 10 as the bolt 26 is tightened through the bolt hole 24 of the upper body portion 12 and the bolt hole 36 of the corner bracket 32. Referring again to the view of FIG. 2, two alternative corner brackets 32a can be seen. As can be seen in the view of FIG. 2, the alternative corner brackets 32a have alternative wing projections 38a which fit under the upper body portion 12, whereas the previously introduced corner brackets 32 have the wing projections 38 which fit partially outside the upper body portion 14, as can be seen in the view of FIG. 6

FIG. 7 is a perspective view of a group of wiring blocks 22 as depicted, for example, in the view of FIG. 2. In the view of FIG. 7, the lower body portion 14 of the automobile audio amplifier 10 is omitted and the wiring blocks 22 can be seen affixed to the amplifier circuit 28 board. It should be noted that the wiring blocks 22 as depicted in FIG. 7 are not necessary to the practice of the invention, and essentially any type of wiring connectors might be used for the purpose. However, it is thought by the inventor that the wiring blocks 22 are particularly useful in the present application. As can be seen in the view of FIG. 7, the wires 30 fit within wiring holes 40 in the wiring blocks 22, and are held in place therein by set screws 42 which are threaded into threaded holes 44. Connection of the wiring blocks 22 to the amplifier circuit 28 board are conventional in nature.

Various modifications may be made to the invention without altering its value or scope. For example, while the embodiment described herein is generally of a flattened rectangular shape, it is within the scope of the invention that other shapes be provided. An example would be a generally oval shape employing the same inventive principles described herein. Indeed, the inventive automobile audio amplifier 10 might be configured to fit in existing holes of particular brands and models of automobiles (such as the holes from which a stock speaker might be removed during the installation of improved larger speakers).

Yet another likely modification would be to attach part of the electronic circuitry of the amplifier circuit 28 partially within or directly affixed to the upper body portion of the automobile audio amplifier 10.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive automobile audio amplifier 10 is intended to be widely used for high quality automobile audio systems, particularly systems which are to be installed "after market".

It has become customary in the industry to supply a mounting board, usually in the trunk of an automobile, for mounting components of the stereo system. This mounting board can serve as the mounting surface 20 and the mounting hole 18 can be cut therein. In such an installation, the wiring blocks 22 and wires 30 will be hidden from view behind the mounting surface 20. However, although it is anticipated that this will be the most usual application, it is by no means the only anticipated application. As just one example, it might be that the mounting hole 18 could be cut in the rear deck surface of an automobile. Certain advantages would result from this application. Firstly, the upper body portion 12 of the automobile audio amplifier would be visually displayed within the passenger compartment, which could be desirable in that the upper body portion 12 of the automobile audio amplifier is simple and attractive in design. Yet another advantage of this last sort of installation is that, in hot weather, it is generally much cooler in the passenger compartment of an automobile than it is in the trunk, particularly when the passenger compartment is air conditioned. In such cases, the upper body portion 12 could more efficiently dissipate heat from the amplifier circuit 28 that it could in the trunk. In any event, the location of the automobile audio amplifier 10 is not critical to the practice of the invention, and it is anticipated that after market users will utilize the unique design and advantages of the inventive automobile audio amplifier 10 in many different installation configurations.

The inventive automobile audio amplifier 10 will also be particularly useful in applications where the installation cannot be in the trunk of an automobile, because the vehicle has no trunk, or because there is not sufficient room in the trunk, or the like. In such installations the fact that the upper body portion 12 presents a relatively small and attractive portion of the automobile audio amplifier 10, and the fact that the wires 30 are so easily hidden, will cause the inventive configuration to be particularly useful.

Since the automobile audio amplifier 10 of the present invention may be readily produced and integrated into existing automobiles and automobile audio systems and devices, and since the advantages as described herein are provided, it is expected that it will be readily accepted in the industry. For these and other reasons, it is expected that the utility and industrial applicability of the invention will be both significant in scope and long lasting in duration.

What is claimed is:

1. An audio amplifier apparatus for mounting within an opening formed in a mounting surface, comprising:
    an amplifier circuit;
    a body having means on a first side thereof forming a housing for said amplifier circuit, and means on a second side thereof opposite said first side forming a generally planar heat sink for said amplifier circuit, the outer surface of said planar heat sink opposite said housing being adapted to radiate heat away from said housing, the outer perimeter of said planar heat sink being larger than the outer perimeter of said housing such that marginal portions of said planar heat sink form a mounting rim extending outwardly relative to at least a substantial portion of the perimeter of said housing, and
    fastening means associated with said mounting rim for affixing said body to the mounting surface when said housing is extended through and disposed within the opening formed in said mounting surface, and said mounting rim is engaged to the mounting surface circumscribing the opening.

2. An automobile amplifier apparatus for mounting within an opening formed in a mounting surface, comprising:
    an amplifier housing including an upper body part formed of a generally planar piece of heat conductive material having an upper surface adapted to radiate heat conducted thereto, and a lower surface opposite said upper surface, said upper body part having a first outer perimeter surrounding said upper and lower surfaces;
    said amplifier housing further including a lower body part having a second outer perimeter smaller than said first outer perimeter, said lower body part being affixed to said lower surface of said upper body part such that marginal portions of said upper body part at least in part defining said first outer perimeter extend outside of said second perimeter and form a mounting rim; and
    an amplifier circuit contained within said lower body part and conductively engaged with said lower surface of said upper body part,
    wherein said lower body part forms a housing for said amplifier circuit, and said upper body part forms a heat sink for the amplifier circuit,
    wherein said amplifier lower body part is adapted to fit through the mounting opening formed in the mounting surface; and
    wherein said mounting rim is adapted to engage the mounting surface when said lower body part is extended through the mounting opening.

3. The automobile amplifier apparatus of claim 2, and further including:
    a plurality of wire attachment lugs affixed to said lower body part for attaching wires to the amplifier circuit.

4. The automobile amplifier apparatus of claim 3, wherein:
    at least some of the wire attachment lugs are in the form of a terminal block.

5. The automobile amplifier apparatus of claim 2, and further including:
    a plurality securing holes located in said mounting rim such that a fastening bolt can be passed through the securing holes without passing though said amplifier lower body part.

6. The automobile amplifier apparatus of claim 5, wherein:

said amplifier upper body part is generally rectangular;

said amplifier lower body part is generally rectangular; and the quantity of securing holes is four, with one of the securing holes located generally at each corner of said generally rectangular amplifier upper body part.

7. The automobile amplifier apparatus of claim 2, wherein:

said amplifier upper body part includes a generally solid metal block.

8. The automobile amplifier apparatus of claim 2, wherein:

said amplifier lower body part includes a sheet metal enclosure for enclosing an electronics assembly forming said amplifier circuit.

* * * * *